US012079299B2

(12) United States Patent
Takiguchi et al.

(10) Patent No.: US 12,079,299 B2
(45) Date of Patent: Sep. 3, 2024

(54) CONTENT MANAGEMENT SYSTEM

(71) Applicant: International Business Machines Corporation, Armonk, NY (US)

(72) Inventors: Ichiro Takiguchi, Kawasaki (JP); Yoji Amano, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 17/452,793

(22) Filed: Oct. 29, 2021

(65) Prior Publication Data

US 2023/0136265 A1   May 4, 2023

(51) Int. Cl.
| | |
|---|---|
| *G06F 17/00* | (2019.01) |
| *G06F 16/951* | (2019.01) |
| *G06F 16/955* | (2019.01) |
| *G06F 16/957* | (2019.01) |
| *G06F 16/958* | (2019.01) |
| *G06F 40/247* | (2020.01) |

(52) U.S. Cl.
CPC .......... *G06F 16/958* (2019.01); *G06F 16/951* (2019.01); *G06F 16/9558* (2019.01); *G06F 16/957* (2019.01); *G06F 40/247* (2020.01)

(58) Field of Classification Search
CPC .. G06F 16/958; G06F 16/9558; G06F 16/957; G06F 40/247; G06F 16/951
USPC ........................................ 715/234, 229, 255
See application file for complete search history.

(56) References Cited

U.S. PATENT DOCUMENTS

| | | | | |
|---|---|---|---|---|
| 7,464,326 | B2 * | 12/2008 | Kawai | G06F 16/958 707/E17.116 |
| 8,108,388 | B2 | 1/2012 | Gideoni et al. | |
| 8,156,141 | B1 * | 4/2012 | Shmulevich | G06F 16/972 709/227 |

(Continued)

FOREIGN PATENT DOCUMENTS

| | | |
|---|---|---|
| JP | 2008097617 A | 10/2008 |
| JP | 5143057 B2 | 2/2013 |

(Continued)

OTHER PUBLICATIONS

Gatial, Change detection and notification method of rich Internet application content, INES 2018 22nd IEEE International Conference on Intelligent Engineering Systems (Year: 2018).*

(Continued)

*Primary Examiner* — Matthew Ell
*Assistant Examiner* — Matthew J Ludwig
(74) *Attorney, Agent, or Firm* — Stosch Sabo

(57) ABSTRACT

Provided is a method for maintaining links in a content management system. The method comprises registering, at a first time, keywords associated with external content that is referenced by an external link embedded in an electronic document. The method further comprises obtaining, in response to a user accessing the electronic document, the external content at a second time that is subsequent to the first time. The external content may be obtained by scraping a resource located at the external link to identify the external content. The method further comprises performing a verification operation to determine whether the external content has changed using the obtained external content and the registered keywords.

17 Claims, 9 Drawing Sheets

(56) References Cited

U.S. PATENT DOCUMENTS

| | | | |
|---|---|---|---|
| 8,661,327 B1* | 2/2014 | Channakeshava | ........................... G06Q 30/0261 715/205 |
| 9,483,557 B2* | 11/2016 | Thambiratnam | ... G06F 16/7844 |
| 9,563,875 B2 | 2/2017 | Heidloff et al. | |
| 9,606,974 B2* | 3/2017 | Gorelick | ............... G06F 16/958 |
| 9,710,443 B2* | 7/2017 | Srinivasan | ............ G06F 40/197 |
| 9,830,400 B2 | 11/2017 | Taylor et al. | |
| 9,882,858 B2* | 1/2018 | Sasatani | ................... H04L 51/48 |
| 11,151,174 B2* | 10/2021 | Denholm | ................ G06F 40/20 |
| 11,531,822 B1* | 12/2022 | Dong | ................. G06F 16/2228 |
| 2005/0034134 A1* | 2/2005 | Lieblich | .............. H04L 41/0213 719/318 |
| 2006/0218499 A1* | 9/2006 | Matthews | ............. G06F 16/313 707/E17.084 |
| 2008/0005685 A1* | 1/2008 | Drews | ................... G06F 3/0481 715/764 |
| 2009/0112938 A1* | 4/2009 | Petri | ....................... G06F 16/21 |
| 2009/0144283 A1* | 6/2009 | Clark | ....................... G06F 16/10 |
| 2010/0076991 A1* | 3/2010 | Nakano | ................. G06F 16/951 707/E17.074 |
| 2010/0145926 A1* | 6/2010 | Jeong | ............... G06Q 30/02 707/E17.108 |
| 2014/0164102 A1* | 6/2014 | Bell | ................... G06Q 30/0255 705/14.45 |
| 2016/0085732 A1* | 3/2016 | Boehler | ................ G06F 40/134 715/207 |
| 2016/0335138 A1* | 11/2016 | Surti | ....................... H04L 67/51 |
| 2017/0019452 A1* | 1/2017 | Hundemer | ........... H04N 21/235 |
| 2017/0374176 A1* | 12/2017 | Agrawal | ............ G06Q 30/0269 |
| 2018/0018078 A1* | 1/2018 | Hundemer | .............. G06Q 50/01 |
| 2018/0089155 A1* | 3/2018 | Baron | ...................... G06F 16/93 |
| 2019/0079753 A1* | 3/2019 | Makkar | ................... G06F 40/30 |
| 2019/0121868 A1* | 4/2019 | Dunne | ................ G06F 18/2321 |
| 2019/0220539 A1* | 7/2019 | Taylor | ...................... G06F 16/33 |
| 2020/0372085 A1 | 11/2020 | Takata et al. | |
| 2020/0372399 A1* | 11/2020 | Lee | ........................ G06F 16/94 |
| 2021/0157770 A1* | 5/2021 | Modeo | ................. G06F 40/221 |
| 2022/0309055 A1* | 9/2022 | Srinivasan | .......... G06F 16/9535 |
| 2022/0342962 A1* | 10/2022 | Gallagher | ............... G06F 21/16 |

FOREIGN PATENT DOCUMENTS

| | | |
|---|---|---|
| JP | 5265523 B2 | 8/2013 |
| JP | 5914186 B2 | 5/2016 |
| JP | 6823201 B2 | 1/2021 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

CONTENT MANAGEMENT SYSTEM

BACKGROUND

The present disclosure relates generally to the field of computing systems, and more particularly to maintaining content consistency and accuracy in a content management system.

A content management system (CMS) is a computer system (e.g., software running on a computer) used to manage the creation and modification of digital content (content management). A CMS is typically used for enterprise content management and web content management. When used for web content management, the CMS may manage websites that include text and embedded graphics, photos, video, audio, maps, and program code that display content and interact with the user.

SUMMARY

Embodiments of the present disclosure include a method, computer program product, and system for maintaining links in a content management system. The method comprises registering, at a first time, keywords associated with external content that is referenced by an external link embedded in an electronic document. The method further comprises obtaining, in response to a user accessing the electronic document, the external content at a second time that is subsequent to the first time. The external content may be obtained by scraping a resource located at the external link to identify the external content. The method further comprises performing a verification operation to determine whether the external content has changed using the obtained external content and the registered keywords.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
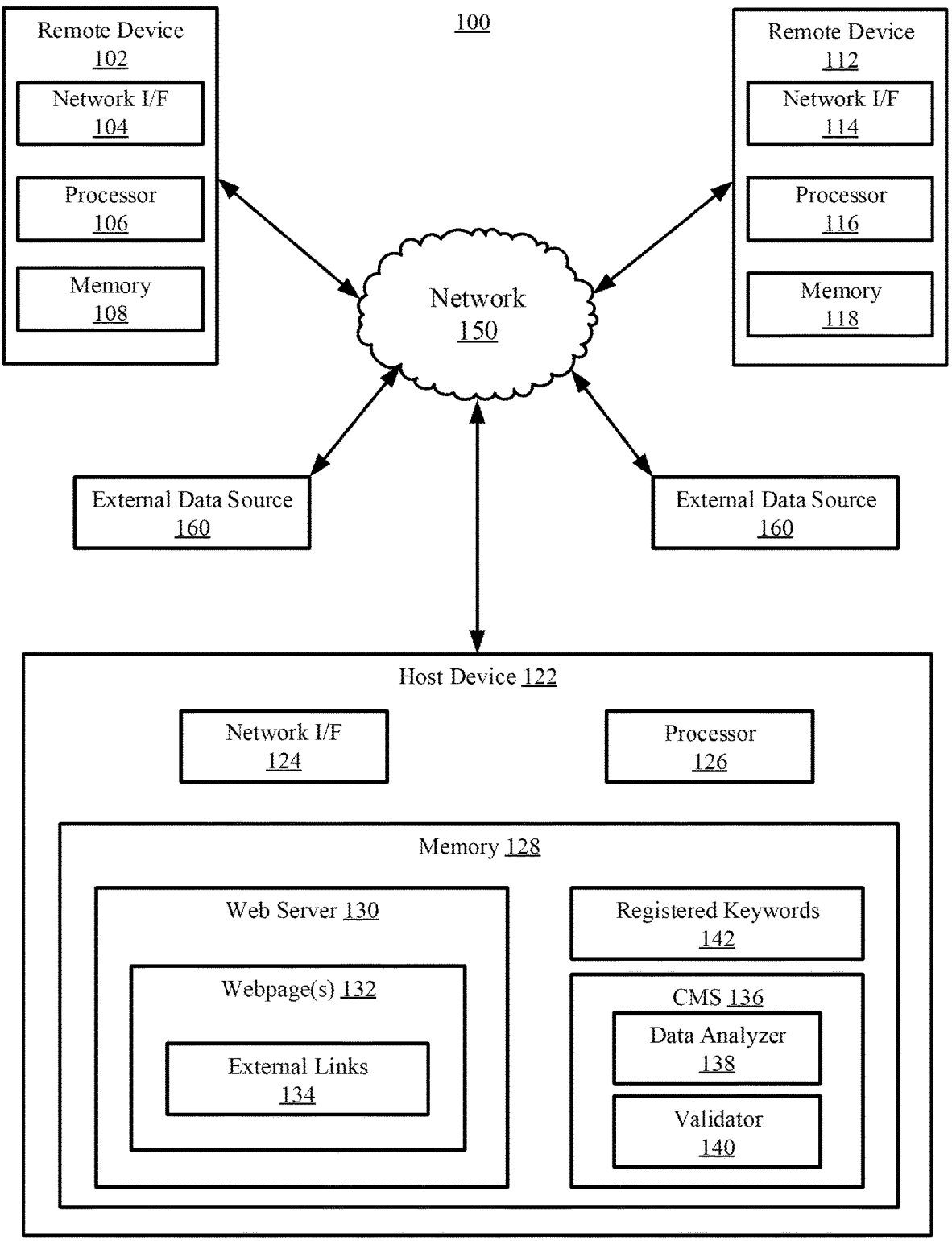
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing systems, and more particularly to maintaining content consistency and accuracy in a content management system. While the present disclosure is not necessarily limited to such applications, various aspects of the disclosure may be appreciated through a discussion of various examples using this context.

As used herein, a "content creator" is a user who manages, owns, publishes, generates, creates, or is otherwise responsible for content found in a content management system. A "reader," on the other hand, is a user who consumes (e.g., reads, accesses, or otherwise views), but does not create, content in the content management system. For example, a content creator may make contents and/or webpages, and the reader may read the content and/or webpages.

Content management systems are often used to manage websites. For example, content management systems may be deployed on webservers to host the website and its related data, such as the text and embedded graphics, photos, video, audio, maps, and program code that display content and interact with the user. Often, a website that is hosted by the webserver includes external content (e.g., data from an external website, such as a website hosted by a different system) or links thereto embedded in the website. This can be important for linking content from disparate sources into a single website for ease of use. For example, a website may embed, and therefore provide to a user, data from a financial website and data from a sports website on the same view. In doing this, an end user can see data that is important to the user without having to go to multiple websites, and the use of embedded external content means that the website is automatically updated when the external website is updated. Likewise, external hyperlinks can help direct the user to different web sites depending on what the user is looking for.

As such, a content creator who uses the content management system (CMS) specifies an external link to complement content created by the content creator. It is desirable if details of the content in the external link destination are maintained as intended by the content creator. For example, a content creator that links to a web site for a particular purpose (e.g., to provide additional details on how to code in a certain programming language) would likely not want to continue linking to that website if it were to change to something else (e.g., to show sports highlights). However, because the content creator is linking to an external source, the content creator may have no control over what is displayed on that external source. This can lead to situations where the external content is no longer relevant to the content provided by the content creator or where the external content is something that the content creator would not approve of, such as an advertisement instead of an informational website. In both cases, the undetected change of the external data/content can create a bad user experience. Additionally, the undetected change of the external data/content can create a security risk if a once safe website that is linked to becomes a source of spyware or other security threat vectors.

In order to minimize the risks associated with external links, content creators can periodically review the contents at the external links and then update their websites when appropriate. However, it is often difficult to immediately detect any changes or use of alternative content in the external link destination as specified in CMS. In such a case, there is no way to detect other than confirming content of the link destination by the content creator or being contacted by a reader about a change of content in the external link destination. This creates a vulnerability where changes to the external content may not be detected until the next periodic review or a user happens to alert the content creator. In the time between the change being made and the periodic review or user-alert detecting the change, readers of the website may be sent to external websites that contain data that the content creator has not reviewed or approved of, leading to worse user experiences and potential cybersecurity risk.

Embodiments of the present disclosure may address the above and other problems by automatically verifying the content of external links using, for example, keywords or other natural language processing techniques. In some embodiments, the CMS system that hosts a website with external links may register keywords and/or other verification data regarding the external content of each link at creation time. When a reader attempts to access the external content, such as by clicking on an external hyperlink or by selecting external content to be viewed in an applet, the content management system may perform data extraction (e.g., keyword detection) to determine what external content is going to be provided to the reader. The content management system may then compare the extracted data to the registered data to determine if the external content has significantly changed. The acts of detecting the contents of the external source and determining whether the external content has changed are collectively referred to herein as verifying the external link. Based on the comparison, the content management system determines whether to alert the content creator that the external content may have changed. Additionally, the content management system may determine whether to alert the reader of a change in the external content based on the result of the comparison.

By automatically verifying the external content when a reader attempts to access it, the content management system may reduce or eliminate the number of readers exposed to changed external content, providing a better user experience for the readers. Additionally, by notifying the content creator of the change, the content management system disclosed herein may allow the content creator to respond more quickly to changed external content.

In some embodiments, all external links on a webpage may be verified whenever a user accesses the webpage. Verifying the external links prior to the user attempting to access the external link allows the content management system to provide an alert (e.g., an icon) of changes to the external content on the webpage without interfering with the user's use of the webpage.

In some embodiments, the external content may be verified only after a certain number of readers have attempted to access the external content. This may be particularly advantageous for websites that have large web traffic where checking each time a user accesses the link has a high computational cost. These embodiments may additionally include a verification date/time check. In other words, even if the number of readers is below the threshold required to re-verify the external link, the external link may require re-verification if the amount of time since the last verification exceeds a threshold (e.g., the previous verification has expired).

In some embodiments, determining whether the external content has changed may utilize natural language processing or other known techniques to generate keywords from the external content. The detected keywords can then be compared to registered keywords to determine a change score. The change score may indicate whether there has been any change to the external content (e.g., as a binary yes or no) and/or an amount of change (e.g., by detecting an amount of overlap between the detected keywords and the registered keywords). The change score may then be used to determine whether and how to alert the content creator and/or the readers of the change, such as by comparing the change score to one or more thresholds. For example, change scores that indicate a small change may not require any notification, whereas change scores that indicate a very large change may require immediate notification of the content creator and/or the readers.

In some embodiments, after verifying the content of the external link, the content management system may update the verification date/time. As discussed herein, the verification date/time may be used when determining whether an external link requires re-verification. As such, updating the verification date/time in response to determining that no changes have been made to the external content can reset the timer for re-verifying the external content.

In some embodiments, the content management system may be configured to alert the reader of the changes in multiple ways. For example, the content management system may add a warning icon to the external link. The warning icon may notify the user that the external content may have changed since it was last verified. Alternatively, or additionally, the content management system may display a warning dialog regarding the external link. The warning dialog may be displayed on the webpage that includes the external link itself, or it may be provided in a pop-up in response to the user selecting the external link. Furthermore, the content management system may hide the external link entirely in response to determining that the external content associated therewith has changed.

In some embodiments, the specific notification/alert method may be based on the change score. For example, the content management system may add an alert icon when the change score indicates a small amount of change to the external content (e.g., the change score is below a first threshold but above a score that indicates no change at all). Meanwhile, the content management system may add a warning dialog when the change score indicates a moderate amount of change to the external content (e.g., the change score is above a first threshold and below a second threshold), and the content management system may omit the external link entirely when the change score indicates a large change to the external content (e.g., the change score is above the second threshold).

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a block diagram of an example computing environment 100 in which illustrative embodiments of the present disclosure may be implemented. In some embodiments, the computing environment 100 may include two remote devices 102 and 112, a host device 122, and two external data sources 160.

Consistent with various embodiments, the host device 122 and the remote devices 102 and 112 may be computer systems. The remote devices 102 and 112 and the host device 122 may include one or more processors 106, 116, and 126 and one or more memories 108, 118, and 128, respectively. The remote devices 102 and 112 and the host device 122 may be configured to communicate with each other through an internal or external network interface 104, 114, and 124. The network interfaces 104, 114, and 124 may be, for example, modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote devices 102 and 112 and/or the host device 122 may be servers, desktops, laptops, or hand-held devices, such as smart phones or tablets.

The remote devices 102 and 112 and the host device 122 may be distant from each other and communicate over a network 150. In some embodiments, the host device 122 may be a central hub from which remote devices 102 and 112 can establish a communication connection, such as in a client-server networking model. Alternatively, the host device 112 and remote devices 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. In some embodiments, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote devices 102 and 112 may be used to access manipulate data stored on the host device for users. For example, the remote devices 102 and 112 may include a user interface (UI) and one or more applications (not shown) that access with data (e.g., the webpage(s) 132) that is stored in the web server 130 in the memory 128. The data access applications may be in the form of a web browser or any other suitable software module, and the UI may be any type of interface (e.g., command line prompts, menu screens, graphical user interfaces). The UI may allow a user to interact with the remote devices 102 and 112 to retrieve data that has been stored by the host device 122. In the case of a content creator instead of a reader, the UI may allow the user to create, modify, store, or otherwise publish the webpages 132.

In some embodiments, the host device 122 may include a web server 130 and a content management system 136 stored in the memory 128. The web server 130 may be software that enables the host device 122 to host one or more webpages 132. The webpages 132 may further contain external links 134. The external links 134 may be, for example, hyperlinks to other webpages or web resources (e.g., documents) stored outside of the host device 122 (e.g., in an external data source 160). The webpages 132 and associated external links 134 may be generated and maintained by a content creator who access the host device 122 using a remote device.

The content management system 136 may be software that maintains the webpages 132. As such, while not shown this way in FIG. 1, the content management system 136 may be a component of the web server 130. The content management system 136 may be configured to analyze and verify (e.g., validate) the external content referenced by the external links 134. In some embodiments, the content management system 136 may be configured to validate the external content in response to a reader accessing the webpage 132 or clicking on the external link 134 associated with the external content. For example, the content management system 136 may determine that a reader (e.g., using a remote device) has selected (e.g., clicked on) an external link 134 and thereby requested the external content from one of the external data sources 160. In response, the content management system 136 may analyze the external content using the data analyzer 138. Analyzing the external content may include extracting the external content using, for example, website scraping methods and then identifying keywords in the extracted external content. The keyword identification may use any known method for analyzing data to extract keywords, such as natural language processing.

The content management system 136 may then validate the external content (e.g., determine whether the external content has changed) using the validator 140 (also referred to herein as the verification engine). In some embodiments, the validator 140 may compare the keywords identified by the data analyzer 138 to the registered keywords 142 to determine whether the external content has changed. For examples, if the registered keywords 142, which were either registered by the content creator or automatically generated when the external content was known to be acceptable, are identified by the data analyzer 138, the validator 140 may determine that the external content has not changed. In some embodiments, the validator 140 may generate a change score that indicates a level or amount of change of the external content using the registered keywords 142 and the identified keywords.

In response to performing the validation process, the content management system 136 may determine whether to alert the content creator and/or reader. If the content management system 136 determines that the external content has changed (or, in some embodiments, has substantially changed), the content management system 136 may provide an alert to the content creator. This may allow the content creator to update the webpage 132, if desired. The content creator may also review the external content and determine that the changes are acceptable and revalidate the external content. Similarly, the content management system 136 may alert the reader that the external content has changed. Specific embodiments for alerting the reader are discussed herein and include, without limitation, adding an icon or dialog box identifying the change to the external link 134.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). For examples, the host devices 122 may be part of a content delivery network (CDN), and they may contain replicas of the same data (e.g., webpages).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
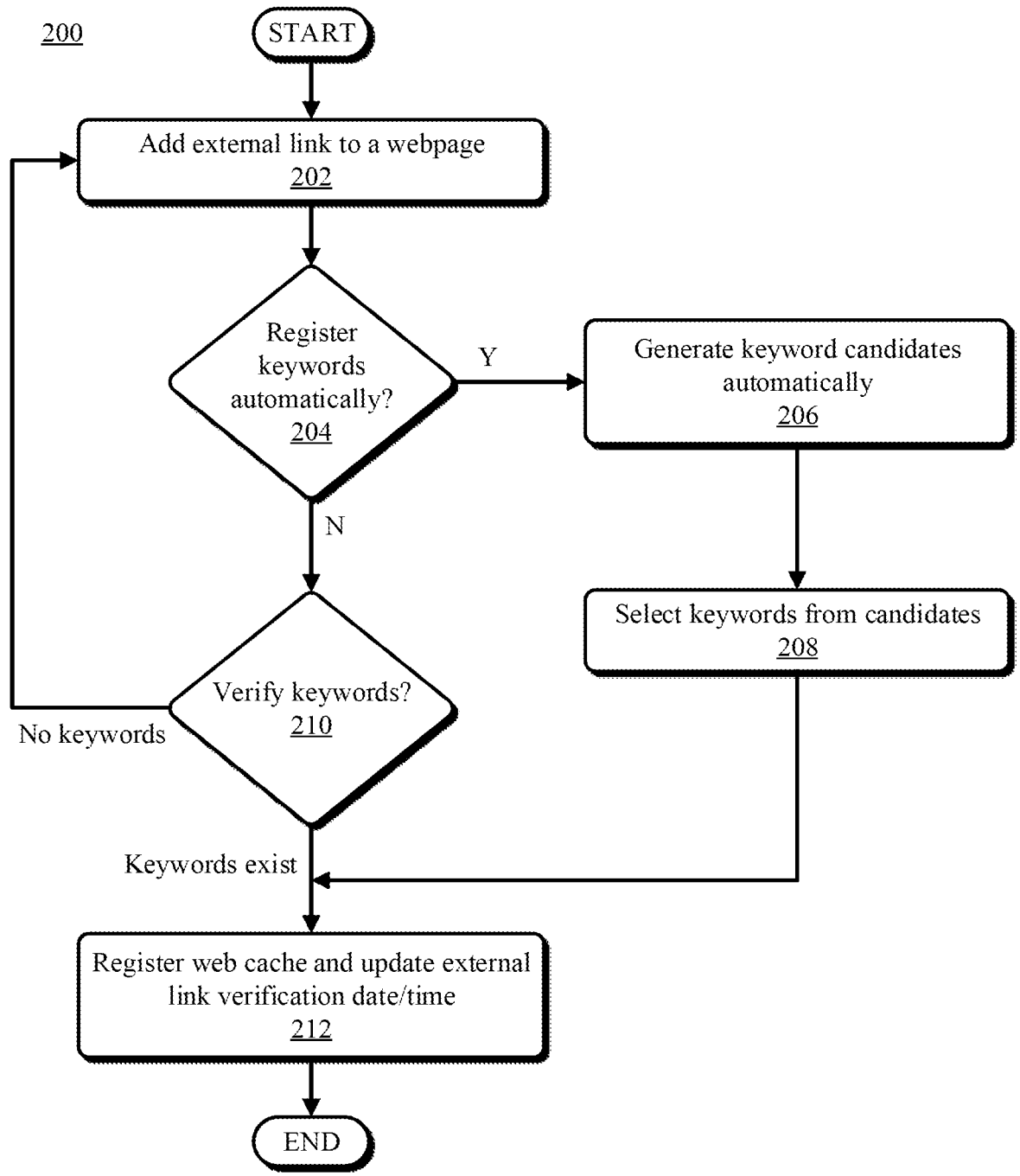
FIG. 2 illustrates a flowchart of an example method for keyword registration for external links embedded in content in a content management system, in accordance with embodiments of the present disclosure.

Referring now to FIG. 2, illustrated is a flowchart of an example method 200 for keyword registration for external links embedded in content in a content management system, in accordance with embodiments of the present disclosure. The method 200 may be performed by hardware, firmware, software executing on a processor, or any combination thereof. For example, the method 200 may be performed by a processor (e.g., in a host device 122). The method 200 may begin at operation 202, where an external link is added to a webpage.

As discussed herein, the webpage may be hosted or otherwise managed by a content management system. The external link may be added to anchor text, and it may be a link that points to a resource that is external to the content management system, regardless of whether it is present on the same system (or clusters of systems) or a separate system. The resource referenced by the external link can be any resource, such as, for example, another webpage, a document (e.g., a pdf), a data object, etc. The external link can be added to the webpage by an owner of the webpage (e.g., the content creator or someone who otherwise has control over the management of the content). For example, the content creator can create or update a webpage managed by the content management system, and during that process the content create can add or otherwise embed the external link in the webpage.

At decision block 204, the content management system determines whether the keywords are going to be registered automatically or manually. In some embodiments, the anchor text may also be registered. The content management system may determine whether keywords are to be automatically or manually registered in response to the external link being added to the webpage (e.g., responsive to operation 202), in response to the content creator deciding to register keywords, or at any other suitable time.

As used herein, manual registration of the keywords includes the content creator (or some other user) sending or otherwise inputting into the system a list of (e.g., 1 or more) keywords for the external content referenced by the external link. The list of keywords are words that are found in, or otherwise describe, the external content. In contrast, automatic registration of keywords involves the system automatically determining the keywords, as discussed herein. This may be done with or without user input. For example, the content management system may generate keyword candidates and provide them to the content creator for selection. Because the candidates were determined by the content management system, this would still be considered automatic registration herein.

The determination of whether keywords are to be manually or automatically registered may be made using user input. For example, the content management system may detect the inclusion of one or more new external links in a webpage managed by the content management system. In response, the content management system may prompt or query the user as to whether to perform automatic or manual registration of keywords (or, in some embodiments, to not register any keywords for the external link). For example, the prompt may ask if the user is going to provide a list of keywords for the external link or if the content management system should automatically generate keywords. If the user indicates that no keyword registration is to occur, indicates that manual keyword registration is to occur, or provides a list of keywords, the content management system may determine that automatic registration of words is not to occur (No at decision block 204). Otherwise, the content management system may determine that automatic keyword registration should occur (Yes at decision block 204).

If the content management system determines that automatic registration is not being performed (No at decision block 204), the content management system may determine whether to verify any keywords that were provided by the user at decision block 210. In other words, at decision block 210, the content management system verifies any keywords that are manually provided. If no keywords are provided by the content creator, or if the provided keywords cannot be verified (e.g., they do not match the keywords found through analysis of the external content), the method 200 returns to operation 202.

If, on the other hand, the content management system is able to verify the manually provided keywords at decision block 210, the verified keywords are registered in a web cache for the webpage (e.g., in a keyword list for the website), and the external link verification date/time is updated at operation 212. Registration of the web cache includes registering the verified keywords and associating the verified keywords with the external link (e.g., as in a relational table or database). For example, a webpage may have multiple external links, and each external link may contain its own set or list of verified keywords in the content management system. After registering the web cache at operation 212, the method 200 may end.

Returning to decision block 204, if the content management system determines that automatic keyword registration is to occur (Yes at decision block 204), then the content management system may automatically generate keyword candidates at operation 206. The keyword candidates can be generated by analyzing the external content using artificial intelligence (AI), natural language processing, and/or any other known technique for generating keywords from content (e.g., image analysis techniques for detecting objects in images or videos, etc.).

For example, in some embodiments, the content management system can perform website scraping to extract data from a website associated with the external link. The extracted data may then be analyzed using any suitable techniques (e.g., AI techniques) to identify keyword candidates. Once the keyword candidates have been identified at operation 206, the keywords are selected at operation 208.

In some embodiments, selecting the keywords includes providing the list of keyword candidates to the content creator and receiving a selection of one or more keywords. In other embodiments, the keywords may be automatically selected by the content management system. For example, the keyword candidates generated at operation 206 may describe the external content in isolation (i.e., without considering the internal content created by the content creator, such as the webpage). Accordingly, selecting the keywords at operation 208 may include comparing the keyword candidates to the internal content of the webpage to determine which keyword candidates apply to both the external and internal content. For example, the content management system may determine a set of keywords associated with the webpage, and then compare the set of keywords to the keyword candidates. Matching keyword candidates may be selected at operation 208. In some embodiments, fuzzy matching (e.g., matching keywords that are similar, such as synonyms or different tenses) may be used instead of, or in addition to, strict matching.

After selecting the keywords at operation 208, the keywords may be registered at operation 212 and the method 200 may end.

In some embodiments, keywords may be weighted based on whether they are optional or essential. For example, the user may provide a list of keywords and associated weights to the content management system during manual registration. Likewise, the content management system may automatically determine weights for certain keywords during the keyword candidate generation phase based on the perceived importance of the keyword. Alternatively, or in addition, the user may provide weights to the keywords generated by the content management system during, for example, the selection operation 208.

The weights may be binary (e.g., optional vs. essential), be ternary, be a score between two endpoints (e.g., between 1 and 100), or have any other suitable form. The weights may be used when verifying the keywords, both during registration of the keywords in method 200 and when verifying the external content has not changed (or substantially changed) when a user accesses the webpage (e.g., during method 300 discussed below with respect to FIG. 3). The keyword weights may also be used to determine what, if any, notification is required when there is a chance to the external content. The keyword weights can be saved as notice attributes for the keywords in the keyword lists, as discussed in more detail below.

Figure 3:
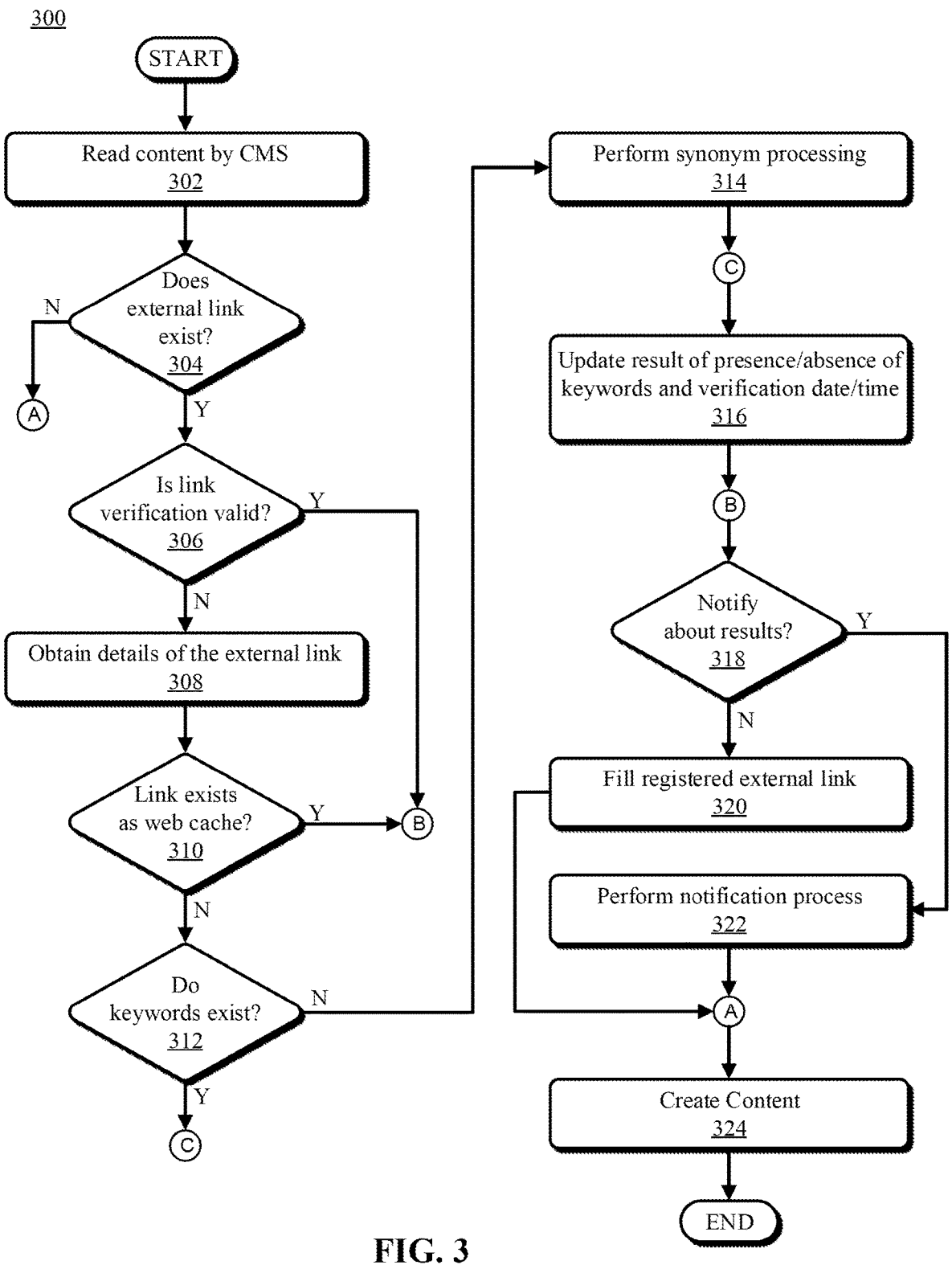
FIG. 3 illustrates a flowchart of an example method for detecting and verifying changes to data referenced by external links, in accordance with embodiments of the present disclosure.

Referring now to FIG. 3, illustrated is a flowchart of an example method 300 for keyword registration for external links embedded in content in a content management system, in accordance with embodiments of the present disclosure. The method 300 may be performed by hardware, firmware, software executing on a processor, or any combination thereof. For example, the method 300 may be performed by a processor (e.g., in a host device 122). The method 300 may be performed whenever a reader access a webpage or when a content creator creates or edits internal content.

The method 300 may begin at operation 302, where content managed by a content management system is read. As discussed herein, the content managed by the content management system, which is also referred to as internal content, may be created by a content creator using the content management system.

At decision block 304, the content management system determines whether the content includes an external link. If the content does not include an external link, the method 300 progresses to operation 324, and the content is created (e.g., published). After creating the content at operation 324, the method 300 may end.

If the content does include an external link, the content management system determines whether the link verification is valid at decision block 306. An external link verification may be valid if the link was recently verified. Accordingly, the link verification date/time for the external link may be compared to a rule (e.g., setting out a valid term) to determine whether it is still valid. If the link verification is valid, the method 300 progresses to decision block 318, which is discussed in greater detail below.

If the link verification is not valid, the content management system obtains details of the external link at operation 308. As discussed herein, the details of the external link may be obtained by analyzing the external link using, for example, web cache data. For example, the content management system may obtain the details by sending an HTTP request with a modification query such as the if-modified-since and/or the entity tag (ETag) queries. The cache information may be filled in the web cache HTTP request.

At decision block 310, the content management system determines whether the external link exists as web cache (i.e., is cached). If the content management system determines that the link exists as web cache, meaning that it has confirmed that there has been no modification in response to the if-modified-since and/or ETag query as discussed herein, the method proceeds to decision block 318, which is discussed below.

If the link does not exist as web cache, the content management system detects that the external content of the external link has been changed, obtains the external content (e.g., by scraping), and determines whether there are any keywords for the link at decision block 312. This may be done by comparing keywords extracted from the external content to keywords in the keyword list for the external link. If the keywords match, then the content management system may determine that the keywords (i.e., from the keyword list) exist in the external content. If the content management system determines that the keywords exist, the method 300 proceeds to operation 316, which is discussed below.

If the content management system determines that the keywords do not exist, the content management system may perform synonym processing at operation 314. This may be done to determine whether the external content has only slightly changed but still includes similar keywords words and, therefore, is likely still discussing the same concepts.

Synonym processing may be performed using known techniques, such as known AI or natural language processing techniques.

At operation 316, the content management system updates the results of the presence/absence of keywords and the verification date/time. In other words, the content management system may determine whether to re-verify the external link (e.g., if the keywords or synonyms thereof exist in the external content) or not re-verify the external link (e.g., if the keywords or synonyms thereof do not exist in the external content). The content management system may also update the verification date/time to indicate whether and when the external content was re-verified.

At decision block 318, the content management system determines whether it is necessary to notify the content creator and/or the reader of the results discussed at operation 316. As discussed herein, the content creator and/or reader may be notified if the external content has changed or, in some cases, has substantially changed. Whether and how to notify the content creator and readers may be based on, for example, whether the keywords exist in the external content, whether synonyms exist in the external content, the number or percentage of keywords that exist in the external content, the attributes (e.g., importance weights) of the keywords, etc.

If notification about the results is unnecessary, the content management system fills the registered external link at operation 320, creates the content using the filled external link at operation 324, and the method 300 ends.

If notification about the results is necessary, the content management system performs the notification process at operation 322, creates the content using the filled external link at operation 324, and the method 300 ends. The method 400 discussed with respect to FIG. 4 shows an example notification process.

Figure 4:
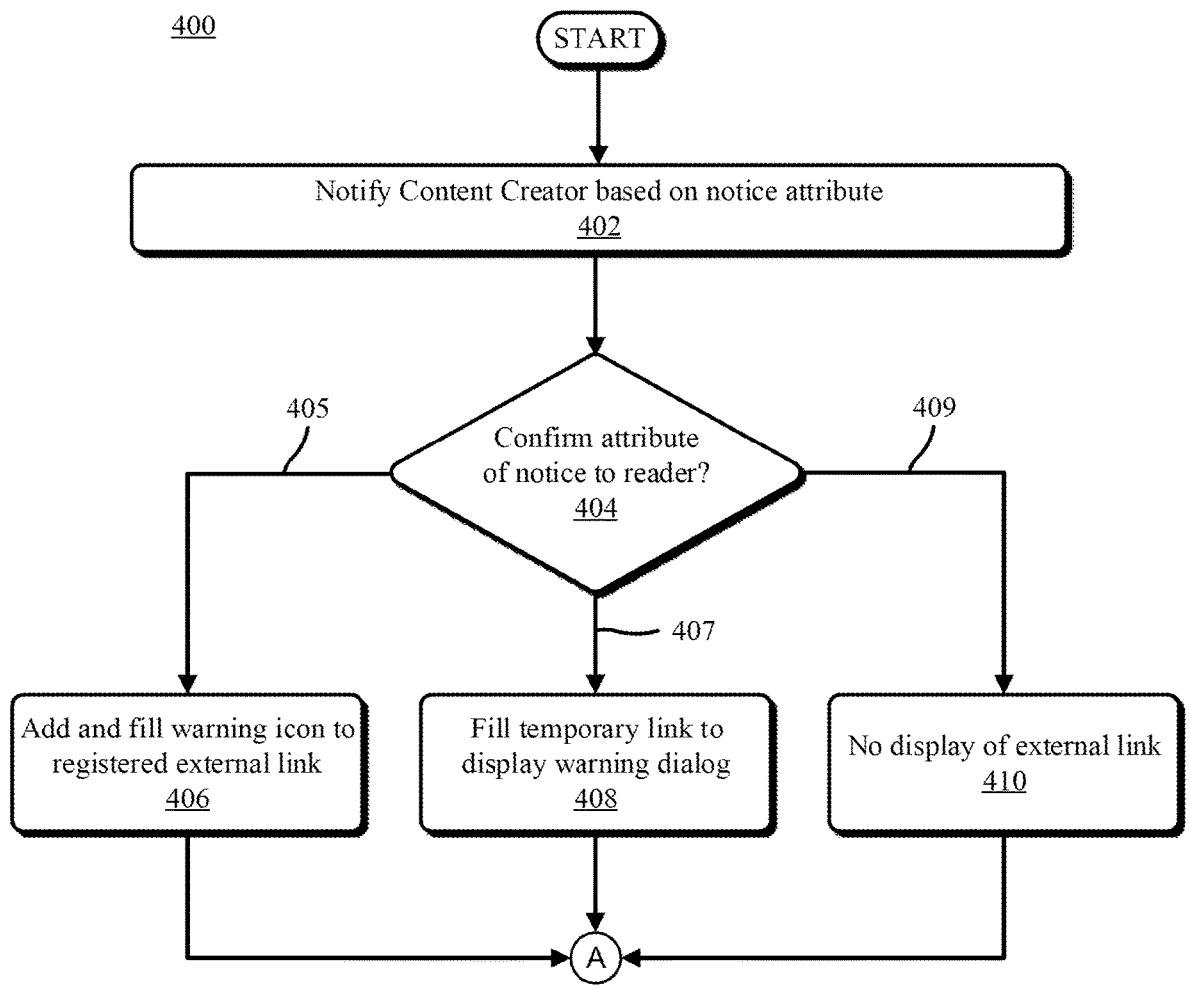
FIG. 4 illustrates a flowchart of an example method for notifying readers and content creators of changes to data referenced by external links, in accordance with embodiments of the present disclosure.

Referring now to FIG. 4, illustrated is a flowchart of an example method 400 for keyword registration for external links embedded in content in a content management system, in accordance with embodiments of the present disclosure. The method 400 may be performed by hardware, firmware, software executing on a processor, or any combination thereof. For example, the method 400 may be performed by a processor (e.g., in a host device 122). The method 400 may be performed as part of operation 322 of method 300 shown in FIG. 3 in response to detecting a change in external content referenced by an external link (e.g., during performance of operations 312-316 of method 300).

The method 400 may begin at operation 402, where the content management system notifies the content creator of the change. The content management system may notify the creator of the change based on the notice attribute(s). The notice attributes may include, for example, the importance of the keywords, the verification date/time of the external link, and upper/lower thresholds for changes scores that require notification. These attributes may be used to determine whether to notify the content creator.

For example, if the content management system determines that an essential keyword (i.e., a keyword that has a notice attribute indicating that it is essential) is not found in the external content, the content creator may be notified of the change. On the other hand, if all essential keywords are found in the external content, but an optional keyword is not, the content creator may not be notified at operation 402. In other embodiments, the presence/absence of keywords (and/or synonyms) may be used to generate a change score, and the notification may be based on whether the change score satisfies a threshold.

At decision block 404, the content management system determines how to notify the reader. In the example shown in FIG. 4, the content management system selects between three options 405, 407, 409. Furthermore, the content management system makes this determination using a set of thresholds. However, it is to be understood that this is just an example, and embodiments with more or fewer options and/or using different triggers for selecting an option are contemplated.

If the content management system determines that the external content has changed but the change score is less than or equal to a lower threshold (e.g., does not contain one or more optional keywords), the content management system selects a first path 405 and puts a warning icon next to the registered external link on the webpage at operation 406. This option may be preferred for small changes since the external content is still likely to be okay, so the inclusion of a relatively unobtrusive warning icon may be sufficient.

If the content management system determines that the change score is greater than the lower threshold but lower than the upper threshold (e.g., an essential keyword is only present as a synonym), the content management system selects a second path 407 and generates a warning dialog for the registered external link on the webpage at operation 408. This option may be preferred for moderate changes since it is unclear whether the external content is still acceptable. The warning dialog may be displayed next the external link or, in some embodiments, may act as a pop-up when the user clicks the external link.

If the content management system determines that the change score is greater than the upper threshold (e.g., an essential keyword is entirely missing), the content management system selects a third path 409 and hides the external link at operation 410. This option may be preferred for large changes where the external content is no longer trusted and may poses a risk to the reader. Hiding the external link prevents the reader from retrieving or viewing the external content from the webpage.

After performance of one of operations 406-410, the method 400 may end. When the method 400 is performed as a suboperation of the method 300, the method 400 may end by, for example, progressing to operation 324 of the method 300 shown in FIG. 3.

Figure 5:
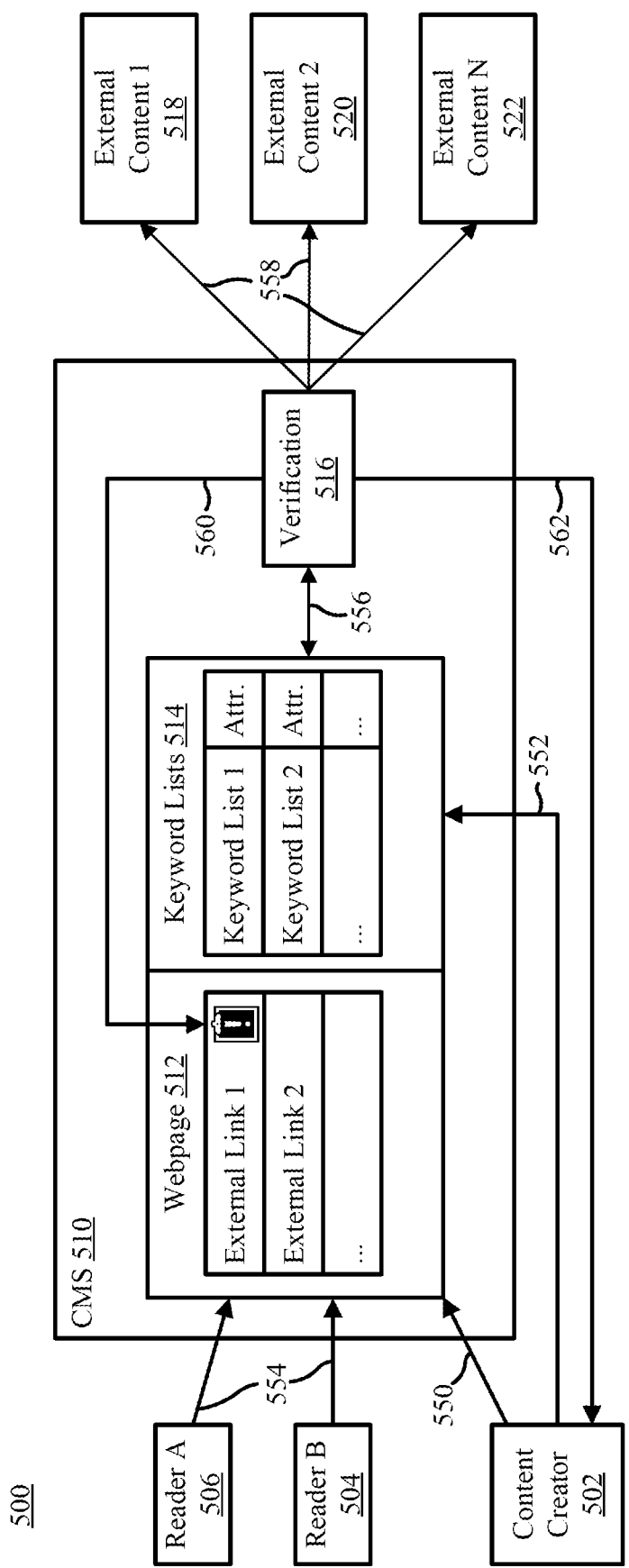
FIG. 5 illustrates an example content management system that is configured to verify external content referenced by an embedded link, in accordance with embodiments of the present disclosure.

Referring now to FIG. 5, illustrated is an example computing environment 500 with a content management system 510 that is configured to verify external content referenced by an embedded link, in accordance with embodiments of the present disclosure. The computing environment 500 may further include external data sources 518, 520, 522 referenced by external links.

A content creator 502 may create a webpage 512 in the content management system 510. This is shown by arrow 550. The content creator 502 may also register keyword lists 514 and associated attributes (Attr. in the figure) for each external link found in the webpage 512. This is shown by arrow 552. For example, external link 1 may be associated with keyword list 1 having a first set of attributes, external link 2 may be associated with keyword list 2 having a second set of attributes, etc.

Readers 504 and 506 may access the webpage 512. This is shown by arrows 554. In response to the readers accessing the webpage, a verification engine 516 may retrieve the keyword lists 514 for the external links. This is shown by arrow 556. The verification engine 516 may also scrape the external content 518-522 associated with the external links. This is shown by arrows 558.

In response to the verification engine 516 detecting a change to the first external content 518, the verification engine 516 adds a notification to the webpage that indicates that the external content 518 associated with external link 1 has changed. This is shown by arrow 560. In the example shown in FIG. 5, this notification is in the form of an alert icon that the readers 504-506 see when accessing the webpage 512. The specific notification may be determined using the attributes for keywork list 1 associated with external link 1, as discussed herein. Additionally, the verification engine 516 notifies the content creator 502 of the change to the first external content 518. This is shown by arrow 562.

Figure 6:
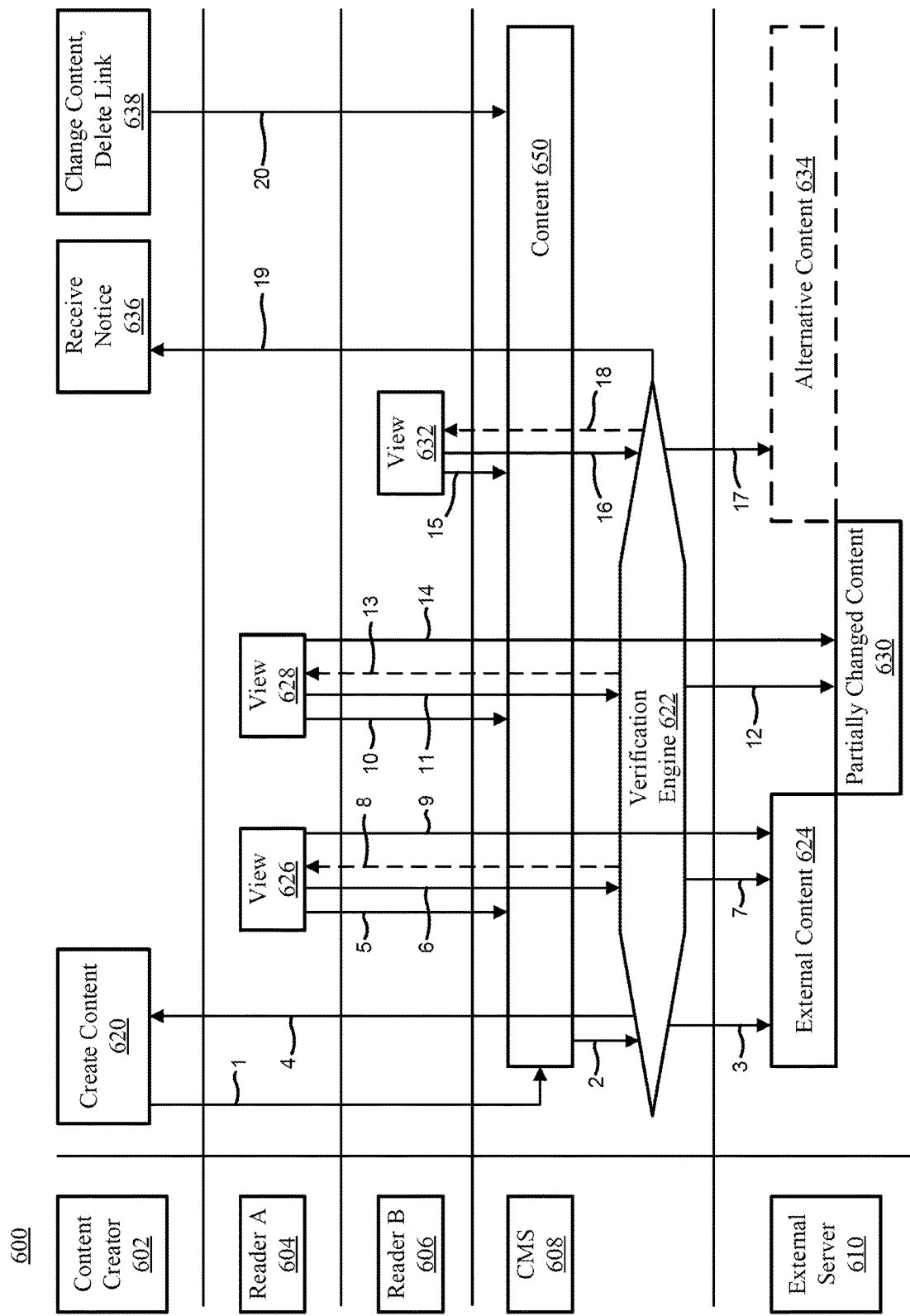
FIG. 6 illustrates an example system flow diagram illustrating the identification and notification of changes to external content, in accordance with embodiments of the present disclosure.

Referring now to FIG. 6, illustrated is an example system flow diagram 600 illustrating the identification and notification of changes to external content, in accordance with embodiments of the present disclosure. The flow diagram 600 shows the major entities, components, and flow of an embodiments of the present disclosure. For example, the flow diagram 600 shows actions taken by the content creator 602, the readers 604, 606, the content management system 608, and the external data sources (e.g., external servers 610). The flow diagram 600 shows these actions over time, with time advancing from left to right in the flow diagram 600.

First, the content creator 602 creates content 650, such as a webpage, at operation 620. The content 650 includes one or more external links to external content 624 hosted by the external server 610. The created content 650 is stored in the content management system 608 at step 1. In response to the content 650 being stored in the content management system 608, a verification engine 622 of the content management system 608 detects the external links in the content 650 at step 2. The verification engine 622 then scrapes the external content 624 at step 3 and verifies the keywords, registers the external links, and then adds the external links at step 4.

Some amount of time after the content 650 has been published, a first reader 604 views the content 650 at operation 626. This includes the first reader 604 accessing the content 650 at step 5, which triggers the verification engine 622 at step 6. The verification engine 622 scrapes the external content 624 and determines that the external content 624 has not changed at step 7. At optional step 8, the verification engine 622 returns a notification of changed external content to the first reader 604. In this case, since the external content 624 has not changed, there is no notification back to the user at step 8. Instead, the user accesses the external content 624 at step 9.

The first reader 604 revisits the content 650 at operation 628. This includes the first reader 604 accessing the content 650 at step 10, which triggers the verification engine 622 at step 11. The verification engine 622 again scrapes the content found on the external server 610 at step 12. However, this time the verification engine 622 finds partially changed content 630 in place of the original external content 624. In this case, because the content is partially changed, the verification engine 622 returns a notification to the first reader 604 at step 13. The notification indicates that the external content linked to by the webpage has changed. However, since the external content is only partially changed, the first reader 604 is still able to access the partially changed content 630 at step 14.

Later, a second reader 606 views the content 650 at operation 632. This includes the second reader 606 accessing the content 650 at step 15, which triggers the verification engine 622 at step 16. Like before, the verification engine 622 scrapes the content found on the external server 610 at step 17. However, this time the verification engine determines that the external content is completely changed and the external link now points to alternative content 634. Accordingly, the verification engine 622 notifies the second reader 606 of the changed content at step 18. In some embodiments, this notification includes hiding the external link from the second reader 606, thereby preventing the second reader 606 from accessing the alternative content 634.

Additionally, the verification engine 622 notifies the content creator 602 of the substantially changed content at step 19. At operation 636, the content creator 602 receives the notification, and at operation 638, the content creator 602 updates the content 650 by deleting the external link. The updated content is then stored as content 650 at step 20.

As discussed herein, in some embodiments, keywords included in a webpage are registered (anchor text may also be registered) when registering an external link in a content management system. The content management system then performs scraping of the external link(s) (e.g., using a crawler, etc.) in place of the browser to verify whether the keywords are included in the external content. If the keywords are not included in the external content, as determined by the scraping, the content management system notifies the content creator and new keywords are registered again.

Changes to the external content can then be detected using the registered keywords. Content held in CMS is accessed (e.g., in response to a reader accessing the webpage). If the content includes an external link, keywords are verified by accessing the external link via scraping. If the external content does not include the registered keywords, a user is notified of the possibility that expected information may not be included in the external link. Additionally, the content creator is notified that an external link points to external content that does not match the registered keywords, which may indicate that the external content has changed.

This processes may advantageously allow detection of changes at an external link in the early stages (e.g., before being accessed by any readers). This enhances continuous content reliability. Furthermore, embodiments of the present disclosure can handle content with text embedded therein (such as a PDF or DOCX), which allows it to be used when the external link is to a document, not just an external webpage. Furthermore, these embodiments can help ensure that the link destination (e.g., the resource referenced by the external link) is safe.

Figure 7:
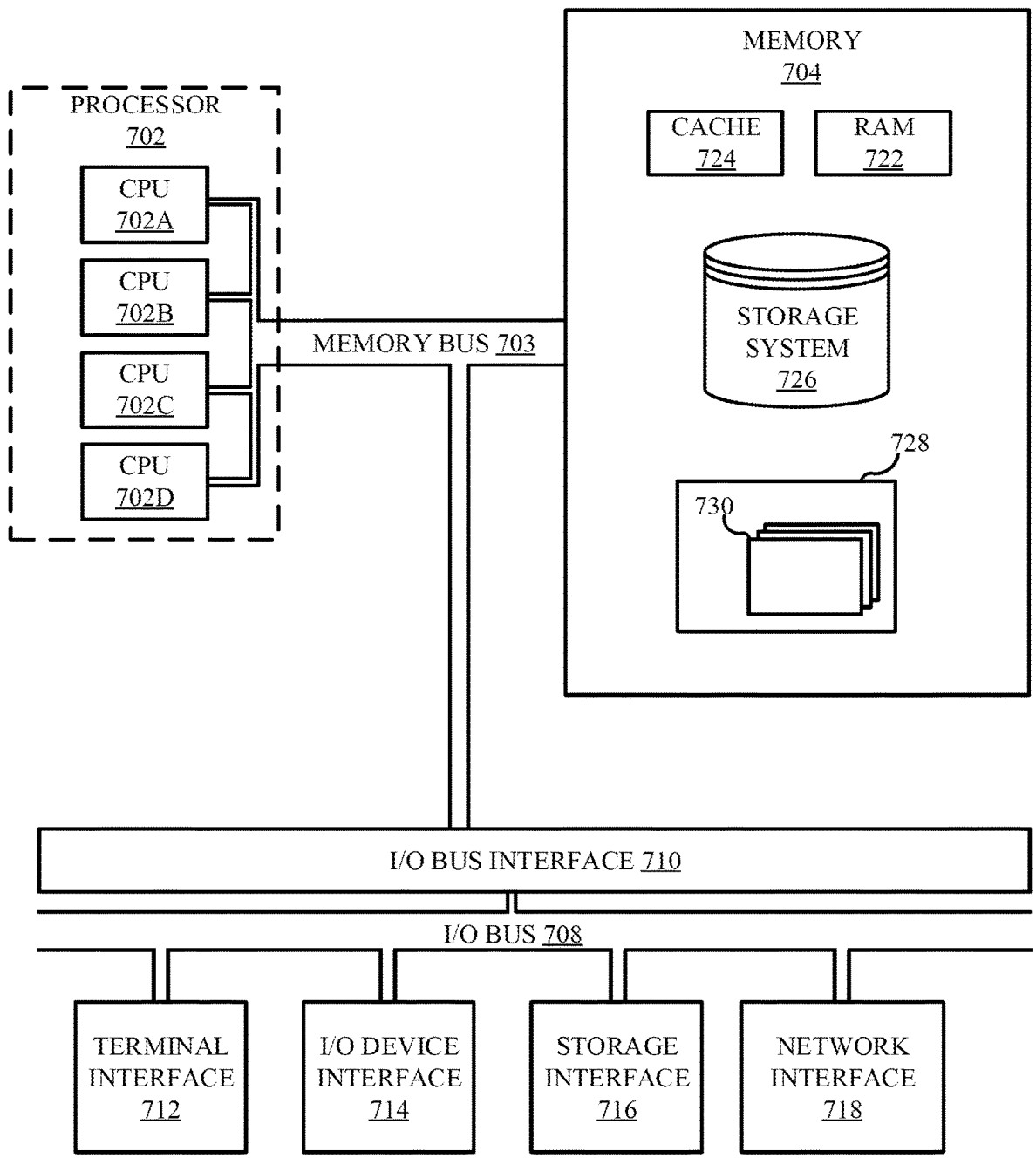
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
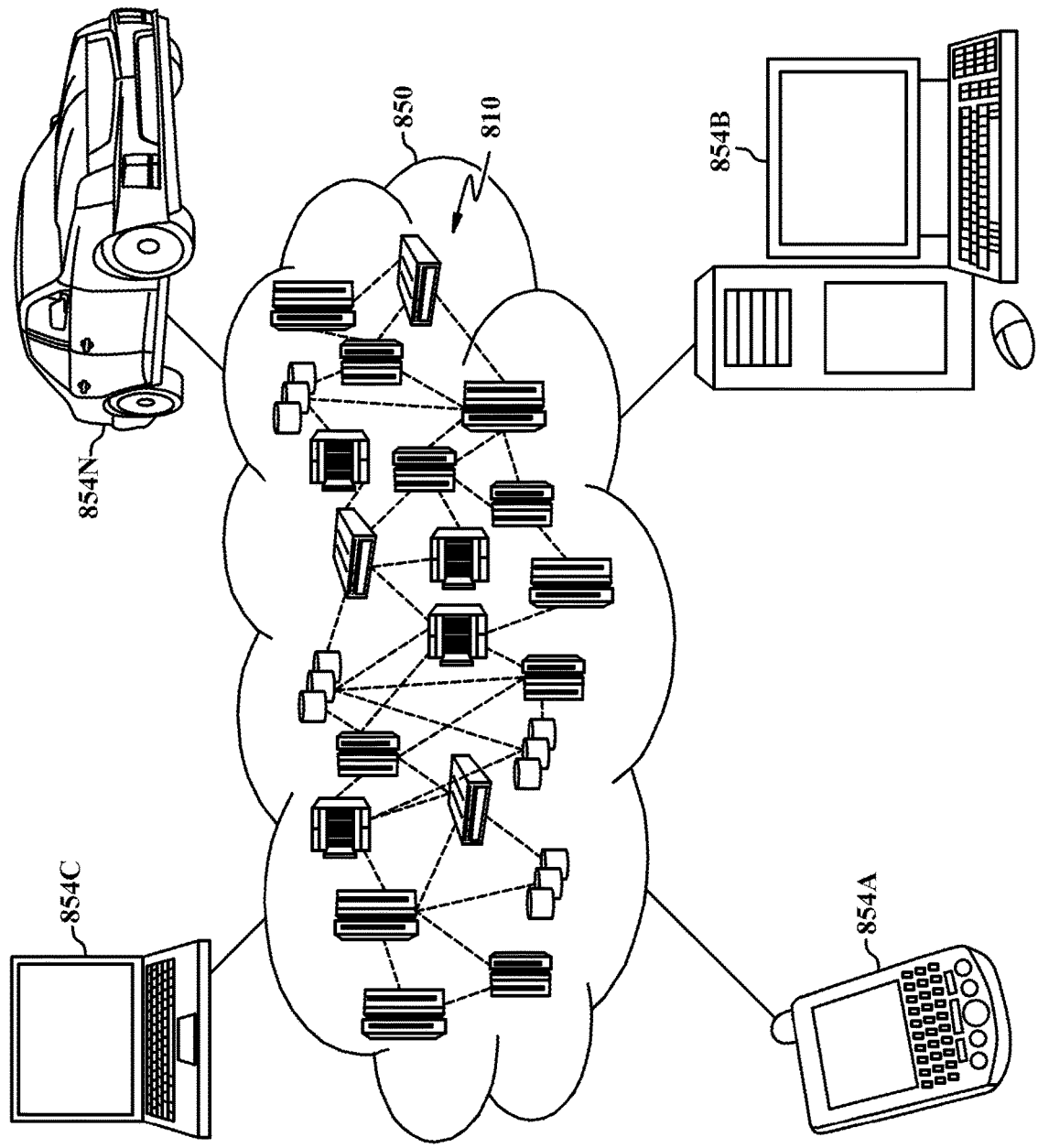
FIG. 8 depicts a cloud computing environment, in accordance with embodiments of the present disclosure.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
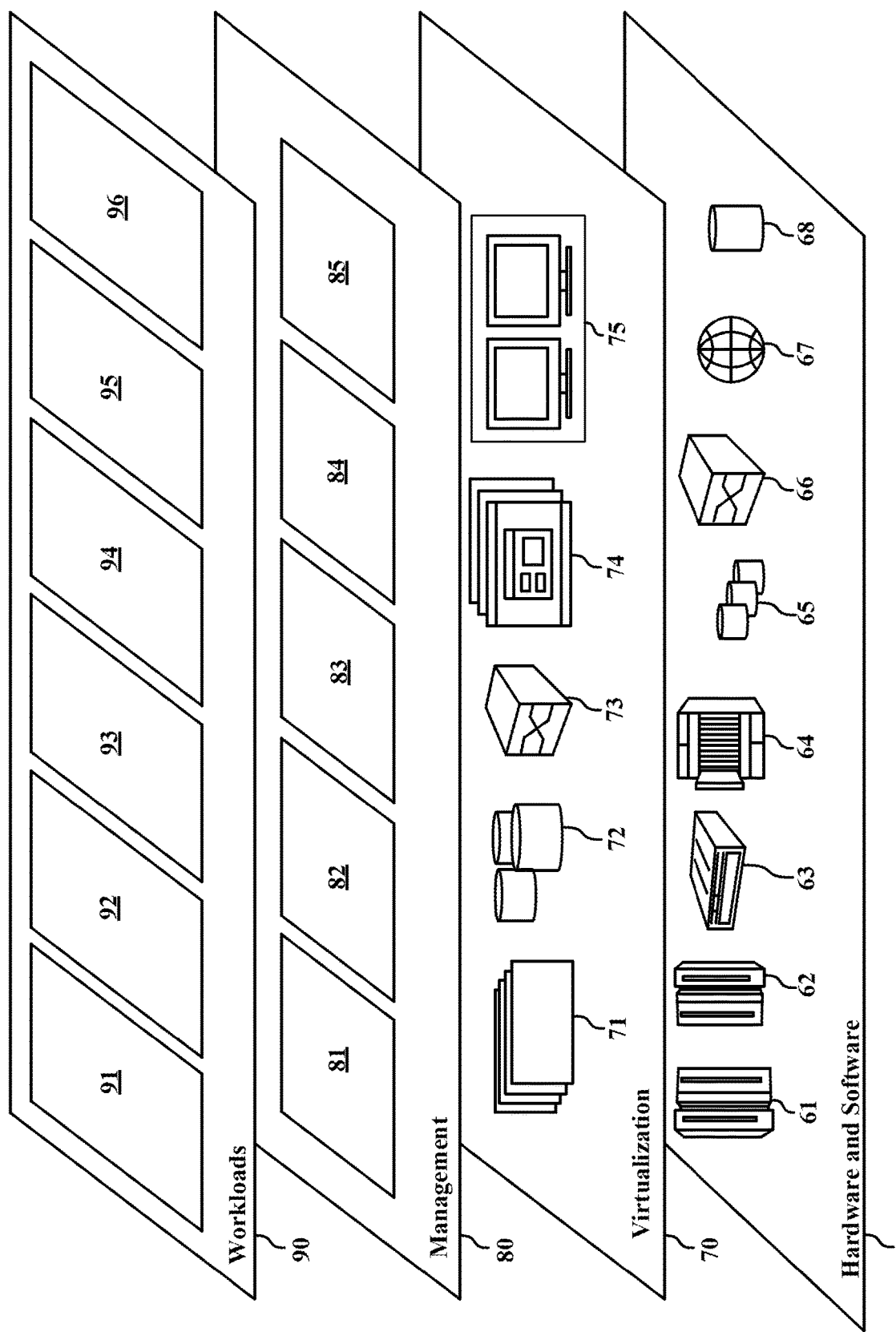
FIG. 9 depicts abstraction model layers, in accordance with embodiments of the present disclosure.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and link verification 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method for detecting changes to external content referenced by external links, the method comprising:
    registering, at a first time, keywords associated with external content that is referenced by an external link embedded in an electronic document, wherein the registered keywords include an optional keyword and an essential keyword;
    scraping, in response to a user accessing the electronic document, at a second time that is subsequent to the first time, a resource located at the external link to identify the external content and extract the external content from the resource; and
    analyzing, using artificial intelligence, the external content to extract keyword candidates from the external content;
    presenting the keyword candidates to an owner of the electronic document;
    receiving, from the owner of the electronic document, a selection of one or more of the keyword candidates as the keywords for the external content; and
    storing the at least one or more selected keywords in a data repository in a content management system that manages the electronic document;
    performing a verification operation to determine whether the external content has changed by comparing the extracted external content and the registered keywords, wherein the verification operation includes determining whether the optional keyword is in the extracted external content and determining whether the essential keyword is in the extracted external content.

2. The method of claim 1, wherein registering the keywords comprises:
    receiving, from an owner of the electronic document, a list of keywords for the external link;
    scraping the resource located at the external link to identify the external content;
    determining that the keywords in the list of keywords are in the external content; and
    storing the list of keywords in a data repository in a content management system that manages the electronic document.

3. The method of claim 1, wherein performing the verification operation comprises comparing the extracted external content to the registered keywords to determine whether the registered keywords are still present in the external content.

4. The method of claim 3, wherein the verification operation further comprising:
    determining, in response to the essential keyword and the optional keyword being present in the external content, that the external content has not changed;
    determining, in response to the essential keyword being present in the external content and the optional keyword not being present in the external content, that the external content has partially changed; and
    determining, in response to the essential keyword and the optional keyword not being present in the external content, that the external content has substantially changed.

5. The method of claim 1, the method further comprising:
    determining, based on the verification operation, that the external content has changed;
    notifying an owner of the electronic document that the external content has changed; and
    notifying the user that the external content has changed.

6. The method of claim 5, wherein notifying the user that the external content has changed comprises one or more actions selected from the group consisting of:
    adding, to the electronic document, an alert icon next to the external link;
    adding a dialog box to the electronic document, wherein the dialog box is configured as a pop-up that is generated in response to the user attempting to select the external link; and
    hiding the external link from the user.

7. A system comprising:
    a memory; and
    a processor communicatively coupled to the memory, wherein the processor is configured to perform a method comprising:
    registering, at a first time, keywords associated with external content that is referenced by an external link embedded in a webpage, wherein the registered keywords include an optional keyword and an essential keyword;

scraping, in response to a user accessing the electronic document, at a second time that is subsequent to the first time, a resource located at the external link to identify the external content and extract the external content from the resource; and analyzing, using artificial intelligence, the external content to extract keyword candidates from the external content;

presenting the keyword candidates to an owner of the electronic document;

receiving, from the owner of the electronic document, a selection of one or more of the keyword candidates as the keywords for the external content; and storing the at least one or more selected keywords in a data repository in a content management system that manages the electronic document;

performing a verification operation to determine whether the external content has changed by comparing the extracted external content and the registered keywords, wherein the verification operation includes determining whether the optional keyword is in the extracted external content and determining whether the essential keyword is in the extracted external content.

8. The system of claim 7, wherein registering the keywords comprises:

receiving, from an owner of the webpage, a list of keywords for the external link;

scraping the resource located at the external link to identify the external content;

determining that the keywords in the list of keywords are in the external content; and storing the list of keywords in a data repository in a content management system that manages the webpage.

9. The system of claim 7, wherein performing the verification operation comprises comparing the extracted external content to the registered keywords to determine whether the registered keywords are still present in the external content.

10. The system of claim 9, wherein the verification operation further comprising:

determining, in response to the essential keyword and the optional keyword being present in the external content, that the external content has not changed;

determining, in response to the essential keyword being present in the external content and the optional keyword not being present in the external content, that the external content has partially changed; and determining, in response to the essential keyword and the optional keyword not being present in the external content, that the external content has substantially changed.

11. The system of claim 7, the method further comprising:

determining, based on the verification operation, that the external content has changed;

notifying an owner of the webpage that the external content has changed; and notifying the user that the external content has changed.

12. The system of claim 11, wherein notifying the user that the external content has changed comprises one or more actions selected from the group consisting of:

adding, to the webpage, an alert icon next to the external link;

adding a dialog box to the webpage, wherein the dialog box is configured as a pop-up that is generated in response to the user attempting to select the external link; and hiding the external link from the user.

13. A computer program product comprising a computer readable storage medium having program instructions embodied therewith, the program instructions executable by a computer to perform a method comprising:

registering, at a first time, keywords associated with external content that is referenced by an external link embedded in a webpage, wherein the registered keywords include an optional keyword and an essential keyword;

scraping, in response to a user accessing the electronic document, at a second time that is subsequent to the first time, a resource located at the external link to identify the external content and extract the external content from the resource; and analyzing, using artificial intelligence, the external content to extract keyword candidates from the external content;

presenting the keyword candidates to an owner of the electronic document;

receiving, from the owner of the electronic document, a selection of one or more of the keyword candidates as the keywords for the external content; and storing the at least one or more selected keywords in a data repository in a content management system that manages the electronic document;

performing a verification operation to determine whether the external content has changed by comparing the extracted external content and the registered keywords, wherein the verification operation includes determining whether the optional keyword is in the extracted external content and determining whether the essential keyword is in the extracted external content.

14. The computer program product of claim 13, wherein registering the keywords comprises:

receiving, from an owner of the webpage, a list of keywords for the external link;

scraping the resource located at the external link to identify the external content;

determining that the keywords in the list of keywords are in the external content; and storing the list of keywords in a data repository in a content management system that manages the webpage.

15. The computer program product of claim 13, wherein performing the verification operation comprises comparing the extracted external content to the registered keywords to determine whether the registered keywords are still present in the external content.

16. The computer program product of claim 15, wherein the verification operation further comprising:

determining, in response to the essential keyword and the optional keyword being present in the external content, that the external content has not changed;

determining, in response to the essential keyword being present in the external content and the optional keyword not being present in the external content, that the external content has partially changed; and determining, in response to the essential keyword and the optional keyword not being present in the external content, that the external content has substantially changed.

17. The computer program product of claim 13, the method further comprising:
- determining, based on the verification operation, that the external content has changed;
- notifying an owner of the webpage that the external content has changed; and
- notifying the user that the external content has changed,
- wherein notifying the user that the external content has changed comprises one or more actions selected from the group consisting of:
    - adding, to the webpage, an alert icon next to the external link;
    - adding a dialog box to the webpage, wherein the dialog box is configured as a pop-up that is generated in response to the user attempting to select the external link; and
    - hiding the external link from the user.

* * * * *